United States Patent [19]
Winberg

[11] Patent Number: 6,026,776
[45] Date of Patent: Feb. 22, 2000

[54] INTERNAL CRANKSHAFT VIBRATION DAMPER

[76] Inventor: Randy S. Winberg, 2200 S. Jason, Denver, Colo. 80223

[21] Appl. No.: 08/882,965

[22] Filed: Jun. 26, 1997

[51] Int. Cl.[7] .................................................. F16C 3/20
[52] U.S. Cl. ..................... 123/192.1; 74/573 F; 74/574; 74/604
[58] Field of Search .............................. 123/192.1, 192.2; 74/604, 573 F, 574

[56] References Cited

U.S. PATENT DOCUMENTS

| | | | |
|---|---|---|---|
| 4,070,971 | 1/1978 | Studebaker | 123/192.2 |
| 4,739,679 | 4/1988 | Berger et al. | 74/604 |
| 4,833,940 | 5/1989 | Ito | 123/192.2 |
| 5,063,892 | 11/1991 | Maiorana | 123/192.2 |
| 5,131,355 | 7/1992 | Bukovics et al. | 123/192.2 |
| 5,295,411 | 3/1994 | Speckhart | 74/604 |

Primary Examiner—Erick R. Solis
Attorney, Agent, or Firm—Pittenger & Smith, P.C.

[57] ABSTRACT

A method and apparatus for internally damping vibration and impulse within a crankshaft utilizes the mass of high density inserts and an energy absorbing medium. By placing the inserts into bores in the counter balance weights and surrounding the inserts with the energy absorbing medium, the inserts are allowed to "float" within the counter balance weight, achieving a pendulum damping effect as the inertial mass of the insert responds to vibration propagating along the crankshaft in both directions. In one embodiment the energy absorbing medium is solid but flexible material; in another embodiment the energy absorbing medium is viscous fluid. Because counter balance weights are located at different points along the crankshaft, the present invention damps vibration closer to the sources of the vibration than conventional dampers, thus reducing the propagation of vibration throughout the length of the crankshaft. The damping mechanism utilizes the mass of inserts normally used for balancing the crankshaft; thus, the considerable mass of conventional damping mechanisms is eliminated.

17 Claims, 5 Drawing Sheets

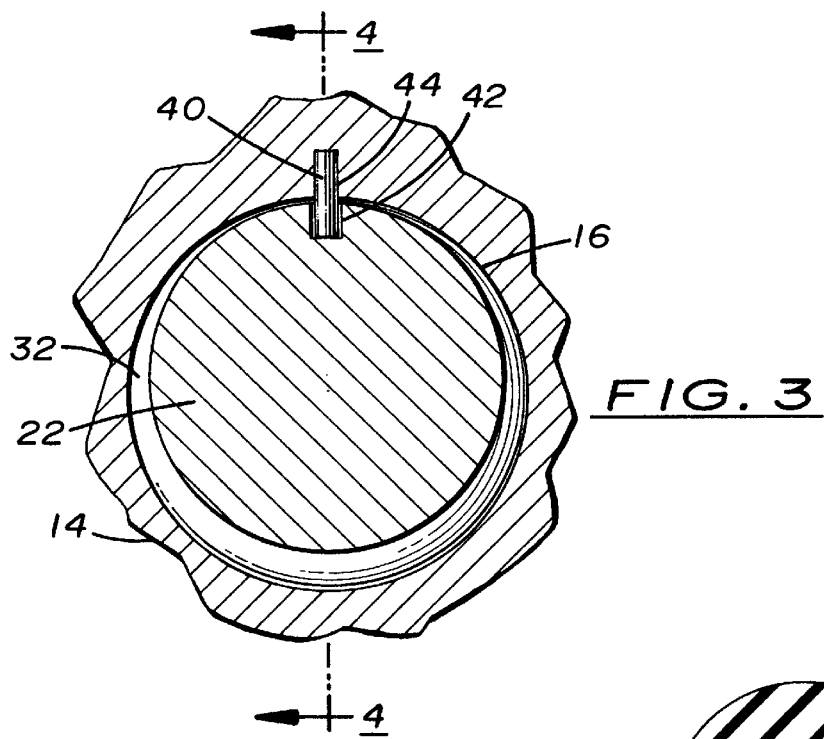
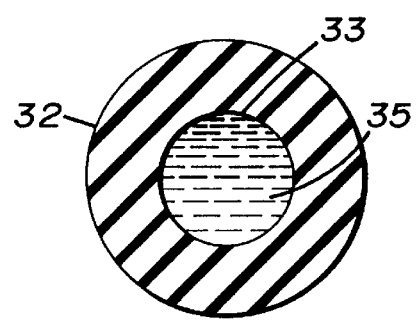
FIG. 3
FIG. 3A
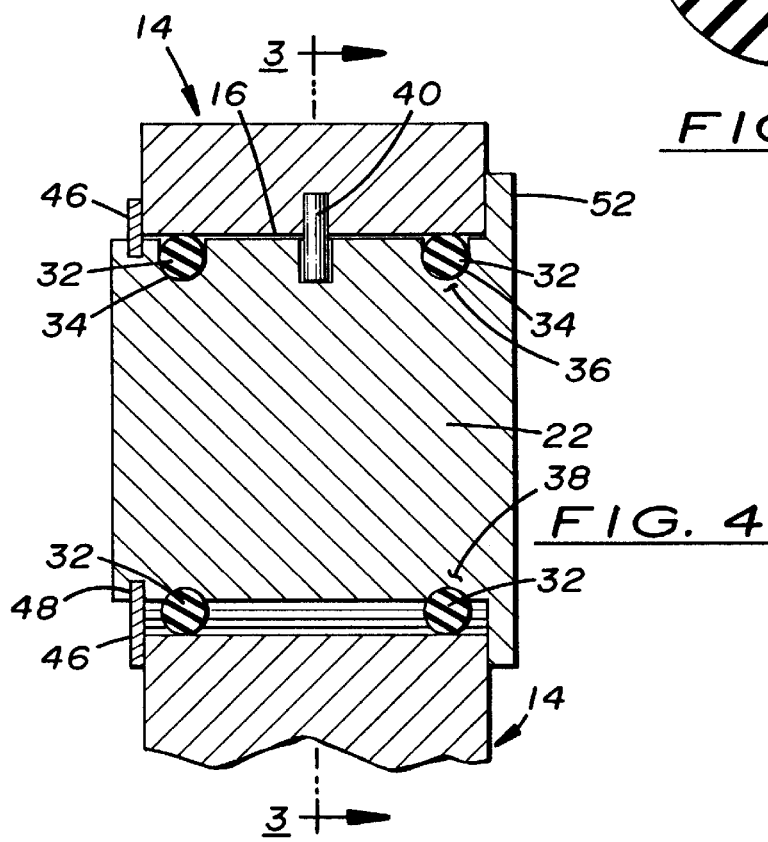
FIG. 4

INTERNAL CRANKSHAFT VIBRATION DAMPER

FIELD OF THE INVENTION

The present invention relates to internal combustion engines. Specifically, the present invention relates to internally damping impulse and vibrations existing in the crankshaft of an internal combustion engine.

BACKGROUND OF THE INVENTION

The motion of the crankshaft of a piston engine is not a purely smooth rotation. Superimposed on the rotation is an oscillatory or back and forth vibratory motion. This motion is caused by the power stroke pulses deflecting the crank pin in relation to either end of the crankshaft. As a cylinder fires, the power stroke of the related piston exerts force on a crankshaft in a direction that opposes force exerted by another cylinder that is in its compression stroke. The resulting torsion has numerous negative side effects on the engine. First and foremost is the fact that if undamped, these impulses and vibrations lead to higher crankshaft stresses which can cause the crankshaft to reach its fatigue limit after an unacceptably short service time. Secondly, if the valve train is driven by the crankshaft, as is the case in virtually all four-cycle engines, the cam timing and consequently valve event timing is altered. This oscillatory nature of the motion also brings about a random fluctuation of valve event timing and subsequent loss of power, and adversely affects the design dynamics of the cam profile. The cam profiles for a high rpm engine are designed to generate the minimum vibrations and impulses possible. Profile computations are based on the assumption that the crankshaft has smooth and steady rotational characteristics. When such vibrations and impulses occur the rpm of the valve train is adversely affected and the engine speed at the point where loss of controlled valve motion occurs is reduced. A third effect, of concern where the perceived smoothness of the engine is important, as is the case for most automobiles, is that unwanted crankshaft vibrations and impulses are felt by passengers and are perceived as rough running of the engine.

The usual technique to damp these unwanted vibrations and impulses is to mount a damper on one of the two ends of the crankshaft. Conventional dampers fall into three broad categories: the elastomeric damper; the viscous damper; and the pendulum damper. The elastomeric damper uses a mass, normally in the form of a ring bonded, by an elastomeric medium of rubber-like form, to a hub firmly attached to the front or rear of the crankshaft. As vibrations and impulses occur the elastomeric medium is put into shear first in one direction and then in the other. The internal friction of the elastomeric medium being high absorbs much of the energy and converts it to heat. The viscous damper works much in the same way as the elastomeric damper, but instead of using the elastomeric damping medium it uses the viscous shear of a mass immersed in a high viscosity fluid.

The pendulum damper incorporates a number of small masses of varying sizes housed within the damper or damping mechanism such that vibrational energy is transmitted into and out of these masses antiphase with the crankshaft vibration and impulse. As the rotation of the crankshaft accelerates, energy is absorbed by the pendulum mass and as the rotation of the crankshaft decelerates energy is given up and put back into the crankshaft.

Conventional damping techniques involve attaching a single damper to one of the ends of the crankshaft, achieving a limited damping effect. Vibrations, impulses and other forces must propagate the entire length of the crankshaft before being damped. A damper placed closer to the source of applied force would reduce the amount of vibration and torsional stress imposed on the crankshaft. Thus, conventional methods of attaching a single damper to one end of the crankshaft eliminates only a portion of the vibrations, impulses and other forces.

In addition to vibration and impulse damping, engine internals must also be balanced for smooth operation. Balancing the crankshaft to reduce main bearing stresses requires placing counter balance weights opposite each rod journal to offset the mass of the rod journal pin, the rod, bearings, wrist pin and piston/ring assembly. To balance the weight of the piston, rod, and journal with a counter weight, it must be considered that only mass directly opposite the rod journal delivers a full counter balancing effect. Because of the greater effectiveness of mass located in this area the total mass needed to balance the piston, rod and journal is minimized. Counter balance weights with increased density can concentrate more mass opposite the rod and journal, thus allowing less total counter balance weight to be used. Crankshafts often utilize metal inserts having greater density than the counter balance weight placed into bores incorporated in the counter balance weight to concentrate mass in the most effective area.

While damping is necessary for a smooth running crankshaft, all methods described thus far seek to damp out unwanted vibrations and impulses with a damper that is solely dedicated to the damping function. Conventional dampers add significant mass to an engine and, combined with heavy counter balance weights integrated into the crankshaft, inhibit acceleration and diminish engine performance. Also, the distance between the point where force is applied to the crankshaft and the counter balance weight increases the stress on the crankshaft.

There is a pressing need for a crankshaft damping mechanism which more effectively dampens unwanted vibration, impulse and other forces along the crankshaft while adding minimal mass to the engine.

SUMMARY OF THE INVENTION

According to the present invention, the foregoing and other objects and advantages are attained by providing a method and apparatus for internally damping crankshaft impulses and vibration close to their sources. The present invention utilizes the mass of the heavy metal inserts incorporated into the counter balance weights to provide a damping mechanism. By surrounding the insert placed in the counterweight with an energy absorbing medium, the inertial mass is allowed to "float" within the counter balance weight, achieving a pendulum damping effect as the inertial mass responds to torsion exerted on the crankshaft in both directions. Because force is exerted on the crankshaft at the connection rod journals, the present invention dampens impulse and vibration at their various sources, thus drastically reducing the propagation of vibration or impulse stresses throughout the length of the crankshaft, as well as damage to the main bearing journals and connecting rod journals. The pendular damping effect also minimizes bending of the crankshaft, thus reducing fatigue in the crankshaft and prolonging its period of service. Because the damping mechanism utilizes the mass of the inserts, the only additional mass added to the crankshaft is the energy absorbing medium surrounding the inertial mass, and the considerable mass of conventional damping mechanisms is eliminated. Advantages and benefits resulting from the present invention include less metal fatigue of the crankshaft, and reduced stress on the main bearings and journals, connecting rods and journals, wrist pins, and piston and ring assemblies. In the event that the crankshaft drives a cam and valve assembly, stress is reduced on all these related components.

In one aspect, the present invention provides apparatus for damping impulses and vibration in a crankshaft of an internal combustion engine comprising a crankshaft for use in an internal combustion engine, where the crankshaft utilizes one or more counter balance weights containing bores, an inertial mass that may be placed in the bores, and an energy absorbing medium placed in the bore between the inertial mass and the counter balance weight. While in the preferred embodiment the orientation of the inertial mass is eccentric to the crankshaft, a concentric orientation may also be utilized. Preferably, the density of the inertial mass equals or exceeds the density of the counter balance weight. The inertial mass is oriented off-center from the center of the bore so that the inertial mass is inhibited from shifting in a radial direction from the crankshaft with centrifugal force and the crankshaft remains balanced during rotation. The energy absorbing medium may be solid, elastomeric material in the form of one or more O-rings, each O-ring fitted into a groove circumscribed with varying depth around the inertial mass to orient the inertial mass off-center from the center of the bore. A viscoelastic medium may also be used, comprising an O-ring of elastomeric material incorporating a channel containing viscous fluid. In an alternative embodiment, the energy absorbing medium may also comprise only the viscous fluid. Preferably, a cylindrical sleeve is used to contain the inertial mass and energy absorbing medium, having sufficient dimensions to be press fitted into the bore. In the embodiments utilizing elastomeric or viscoelastic media, a pin is inserted into the inertial mass to prevent the inertial mass from rotating out of its off-center orientation. The pin fits within the inertial mass with sufficient tolerance to allow the inertial mass to move in a pendular motion in response to torsion exerted on the crankshaft in both directions. The apparatus further comprises hardware to retain the inertial mass and energy absorbing medium in the bore.

In another aspect, the invention provides a method of damping vibration and impulses comprising the steps of providing a crankshaft for use in an internal combustion engine, where the crankshaft utilizes one or more counter balance weights containing bores, placing inertial mass and an energy absorbing medium into these bores, and compressing the energy absorbing medium between the inertial mass and the counterweight in response to vibration in the crankshaft. The method further comprises the step of maintaining the inertial mass in an off-center orientation with respect to the center of the bore so that the inertial mass is inhibited from shifting in a radial direction from the crankshaft with centrifugal force and the crankshaft remains balanced during rotation. The method further comprises the step of retaining the inertial mass and energy absorbing medium in the bore.

The overall result of the present invention is more effective damping of vibrations and impulses propagating along a crankshaft for an internal combustion engine, thus providing a smoother running engine while prolonging the life of engine internals; the present invention also provides a reduction in weight of the crankshaft and related components, resulting in quicker acceleration and better engine performance. Other benefits and advantages of the present invention will become apparent from the following detailed description of the invention when it is considered in conjunction with the accompanying drawings.

BRIEF DESCRIPTION OF THE DRAWINGS

FIG. 3 shows a section view of the inertial mass, energy absorbing medium, anti-rotation pin, and retaining clip;

FIG. 3A shows a section view of a viscoelastic energy absorbing medium;

FIG. 4 shows a side section view of the inertial mass, energy absorbing medium, anti-rotation pin and retaining clip;

DETAILED DESCRIPTION OF THE INVENTION

Figure 1:
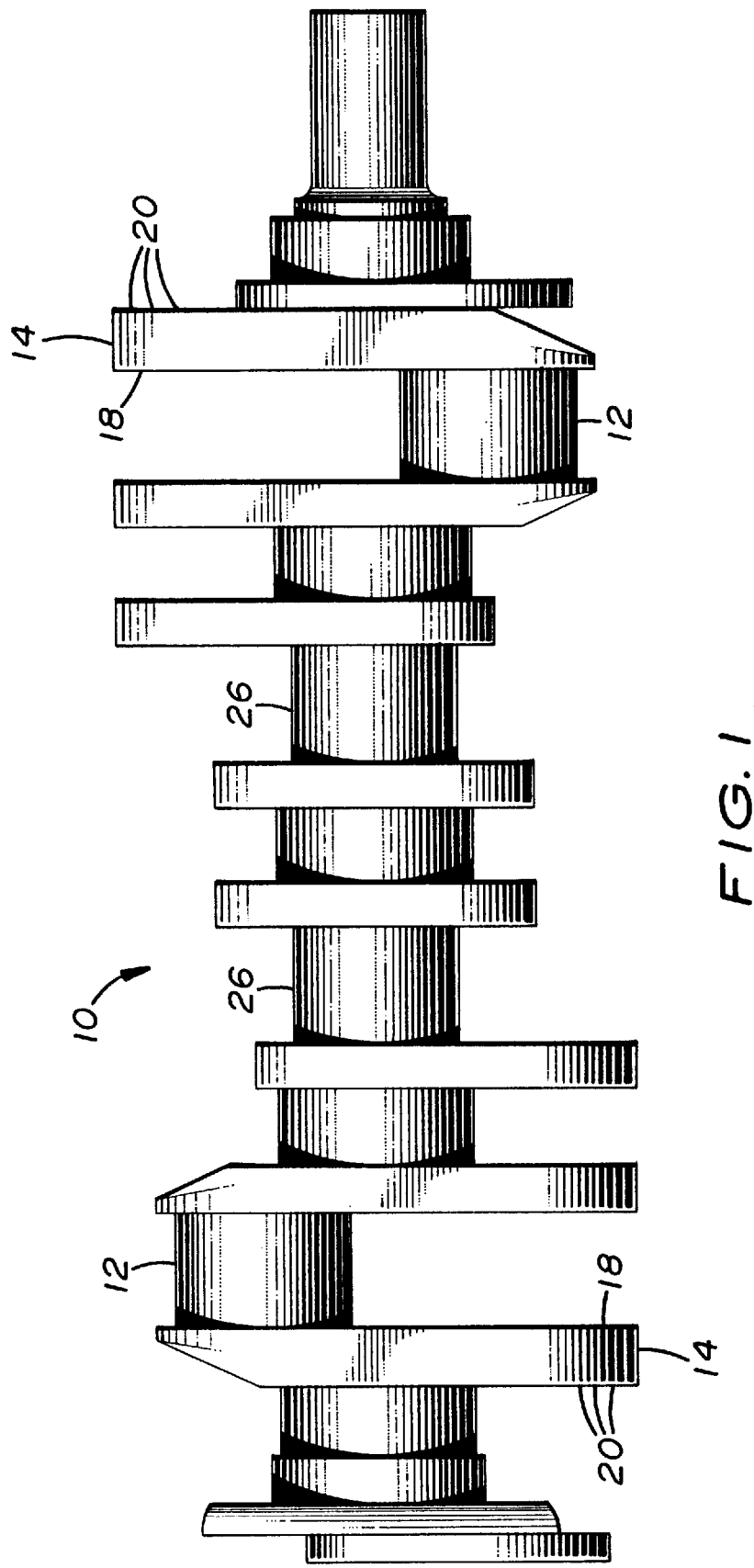
FIG. 1 shows a combustion engine crankshaft with counter balance weights incorporating the pendular damping system of the present invention.
Figure 2:
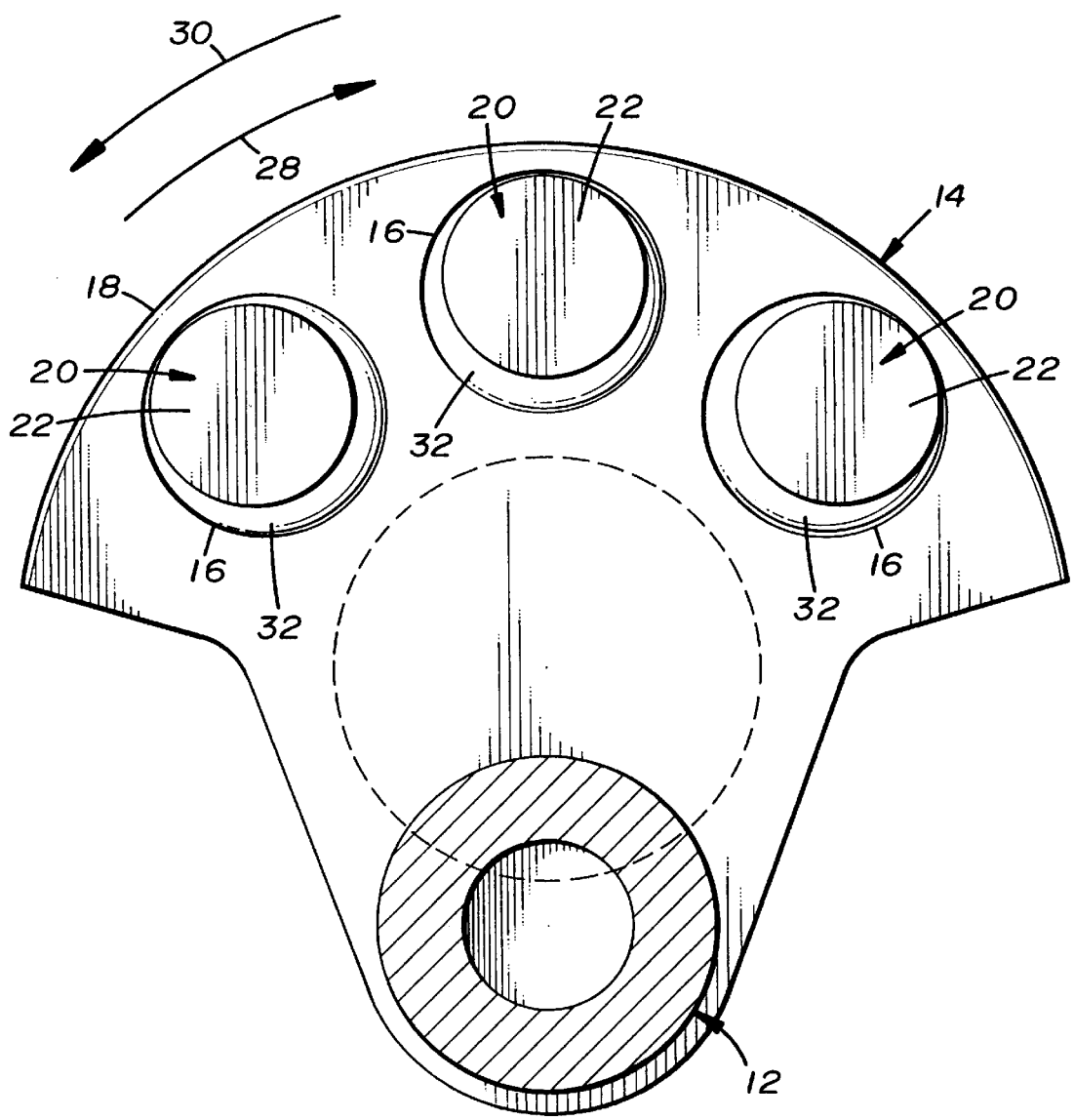
FIG. 2 shows a counter balance weight incorporating the pendular damping system of the present invention.

Directing attention to FIG. 1, vibration is transferred to crankshaft 10 at connecting rod journals 12. Counter balance weights 14 are integrated into crankshaft 10 adjacent and opposite connecting rod journals 12. Counter balance weights 14 protrude perpendicularly from crankshaft 10, and are in the shape of thick metal flanges 18 having arcuate edges that taper toward crankshaft 10. Turning to FIG. 2, counter balance weight 14 contains one or more bores 16 that are oriented perpendicular to flange 18 of counter balance weight 14 and parallel to crankshaft 10. Internal damping mechanism 20 is inserted into bore 16 to damp vibrations and impulses transferred to connecting rod journal 12. Internal damping mechanism 20 consists of inertial mass 22 and vibration and impulse damping medium 32. Inertial mass 22 preferably is a solid cylinder constructed from steel, tungsten, or other similar material of sufficient density. Inertial mass 22 may have a diameter of varying dimension, depending on the density of the material used, and its position within counter balance weight 14. As inertial mass 22 will achieve optimum counter balancing effect when placed directly opposite connecting rod journal 12, less material is necessary than when the inertial mass 22 is placed elsewhere within counter balance weight 14. Counter balance weight 14 rotates about main bearing journal 26 in direction 28. Inertial mass 22 is positioned off-center with respect to bore 16 to prevent centrifugal force from shifting inertial mass 22 in a radial direction from main bearing journal 26 as counter balance weight 14 rotates. By positioning inertial mass 22 in this off-center orientation, counter balance weight 14 is prevented from throwing crankshaft 10 out of balance. The motion caused by pistons in their power strokes causes a back and forth vibratory or oscillatory motion in the directions 28 and 30. As inertial mass 22 is forced to rotate on along the wall of bore 16, a pendulum damping action takes place. When force propagates in direction 28, inertial mass 22 responds by rotating in direction 30. Conversely, when force propagates in direction 30, inertial mass 22 responds by rotating in direction 28. By placing vibration and impulse damping medium 32 around inertial mass 22 in bore 16, inertial mass 22 does not come into contact with bore 16, and vibrational energy and impulse is converted to heat through the internal friction of elastomer 32 as well as damped by the pendular motion of inertial mass 22.

FIG. 3 shows a section view of the inertial mass 22 and vibration and impulse damping medium 32 implemented as elastomer 32. Elastomer 32 is an O-ring that surrounds inertial mass 22, and has an outer diameter that is slightly less than the diameter of bore 16. The O-rings may be constructed from material of various thickness, ranging from approximately 1/10" diameter to approximately 1/4" diameter. Preferably, heat resistant elastomeric material such as neoprene, viton, or the like is used, and elastomer 32 may be either solid elastomeric material or viscoelastic material. In a preferred embodiment, the elastomeric O-ring 32 contains a channel 33 running the circumference of the O-ring that is filled with a viscous fluid 35 (FIG. 3A). However, any material, composite material, or apparatus that exhibits the combination of viscous and elastomeric properties may be used. In the preferred embodiment, silicon is used for the viscous fluid 35, but any fluid that may retain sufficient viscosity at extreme temperatures may be used. Viscous fluid 35 ranges in viscosity from approximately 200K centistokes to approximately 1.4M centistokes. Elastomer 32 has a durometer range of approximately 35 durometer to approximately 115 durometer, depending on the diameter of the O-ring and the material used. In the preferred embodiment, elastomer 32 is implemented as two separate O-rings surrounding inertial mass 22, located at either end of inertial mass 22 (FIG. 4). Elastomer 32 is fitted into groove 34 circumscribed with varying depth around inertial mass 22. Groove 34 at location 36 is deeper than at location 38, allowing inertial mass 22 to be positioned off-center within bore 16. Anti-rotation pin 40 is used to maintain the off-center orientation of inertial mass 22 within bore 16. Anti-rotation pin 40 fits into groove 42 of inertial mass 22 and groove 44 in bore 16. Sufficient tolerance is allowed between grooves 42 and 44 for anti-rotation pin 40 to fit loosely so that inertial mass 22 may still shift in a pendular motion and damp vibration and impulses.

Figure 6:
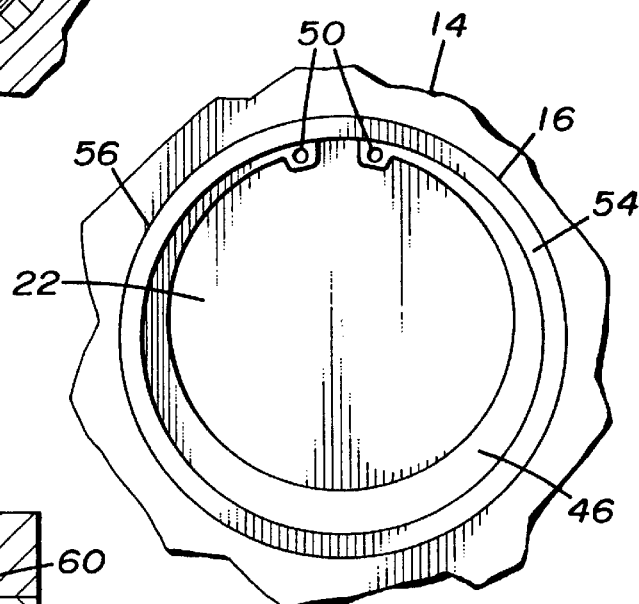
FIG. 6 shows an end view of the inertial mass, sleeve, and retaining clip.

Retaining clip 46 (FIG. 4) secures inertial mass 22 and vibration and impulse damping medium 32 within bore 16. Retaining clip 46 is made of spring steel or similar material, and is readily available from any hardware store or automotive parts store. Retaining clip 46 is placed into groove 48 of inertial mass 22, and is removed by expanding its diameter. As seen in FIG. 6, retaining clip 46 utilizes holes 50 that allow easy expansion and retraction. If bore 16 completely spans counter balance weight 14, retaining clip 46 may be used, or inertial mass 22 may incorporate flange 52 (FIG. 4).

Figure 5:
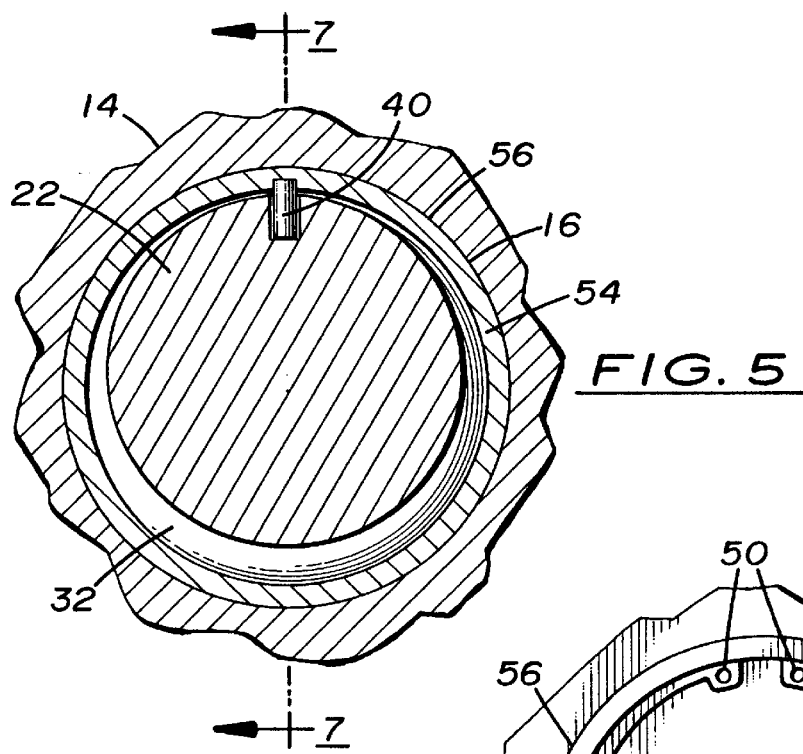
FIG. 5 shows a section view of the inertial mass, energy absorbing medium, anti-rotation pin and sleeve.
Figure 7:
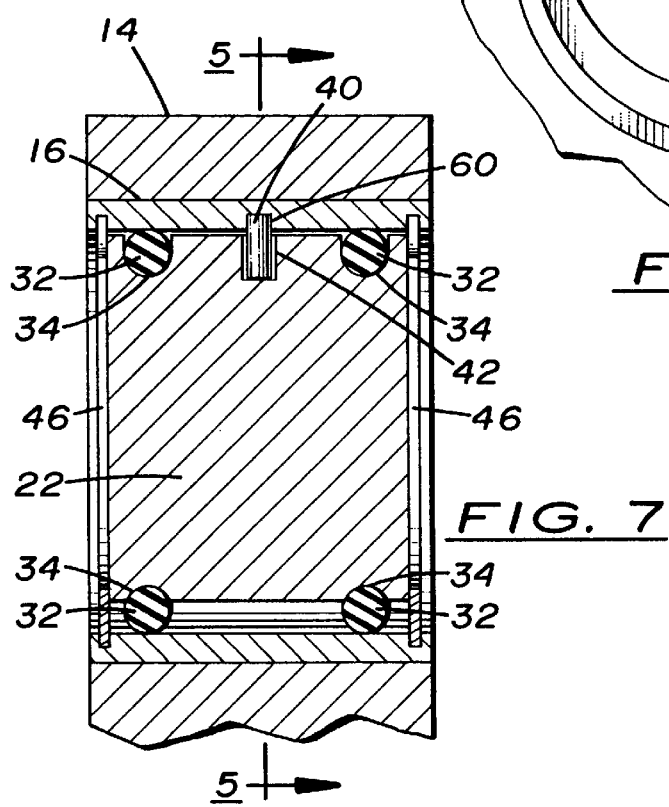
FIG. 7 shows a side section view of the inertial mass, energy absorbing medium, sleeve, anti-rotation pin and retaining clip.

FIG. 5 shows a section view of an alternate embodiment of internal damping mechanism 20. In this embodiment, sleeve 54 is used to contain inertial mass 22 and vibration and impulse damping medium 32. Sleeve 54 has a hollow, cylindrical shape and is open at end 53 and end 55. Sleeve 54 is constructed of steel or other suitable material. The outer diameter 56 of sleeve 54 is of sufficient dimension to require sleeve 54 to be press-fitted into bore 16. Groove 60 is provided in sleeve 54 so that anti-rotation pin 40 may be used with sleeve 54. Retaining clip 46 may also be used with sleeve 54, and is placed into groove 60. Inertial mass 22 and vibration and impulse damping medium 32 may be secured within sleeve 54 in a similar manner as shown in FIG. 4, or retaining clip 46 may be placed on both sides of inertial mass 22 as shown in FIG. 7. By using sleeve 54, no special machining is required of bore 16 in counter balance weight 14.

Figure 8:
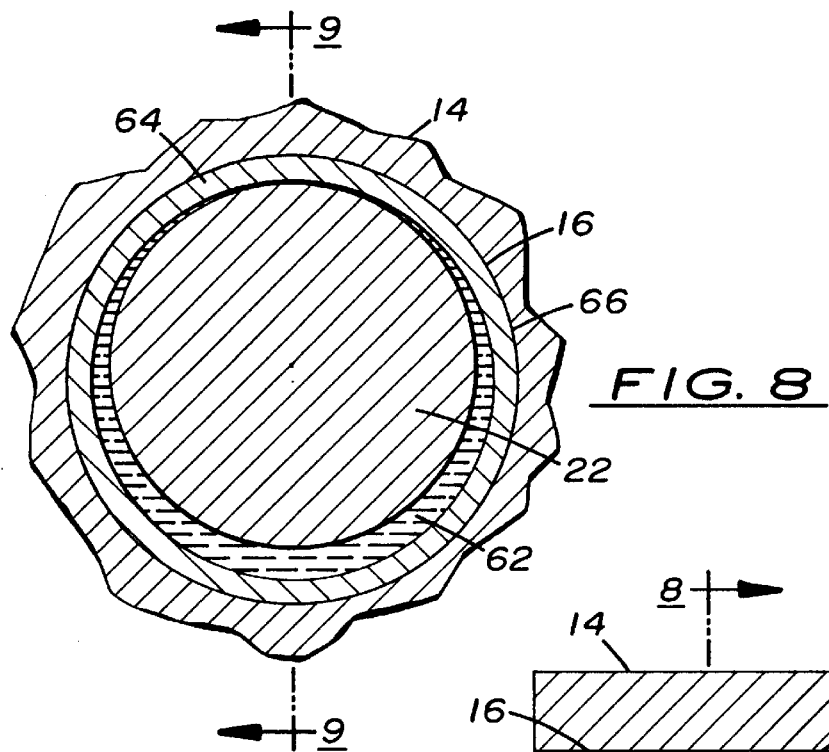
FIG. 8 shows a section view of the inertial mass, viscous fluid, and sleeve.

Turning now to FIG. 8, vibration and impulse damping medium 32 may also be implemented as viscous fluid 62. When viscous fluid 62 is used for vibration and impulse damping medium 32, damping is achieved through viscous shear and the pendular motion of inertial mass 22. Viscous fluid 62 ranges in viscosity from approximately 200K centistokes to approximately 1.4M centistokes. When viscous fluid 62 is relatively thin, vibration and impulse in the crankshaft is reduced through damping predominately by the pendular movement of inertial mass 22. When the viscous fluid 62 is relatively thick, energy is converted to heat through viscous shear. In the preferred embodiment, silicon is used for viscous fluid 62, but any fluid that may retain sufficient viscosity at extreme temperatures may be used. In this alternative embodiment, inertial mass 22 does not require the anti-rotation pin 40. Inertial mass 22 is shifted to an off-center position within sleeve 64 when crankshaft 10 begins rotating at low RPM, so crankshaft 10 is balanced when rotating at high RPM.

Figure 9:
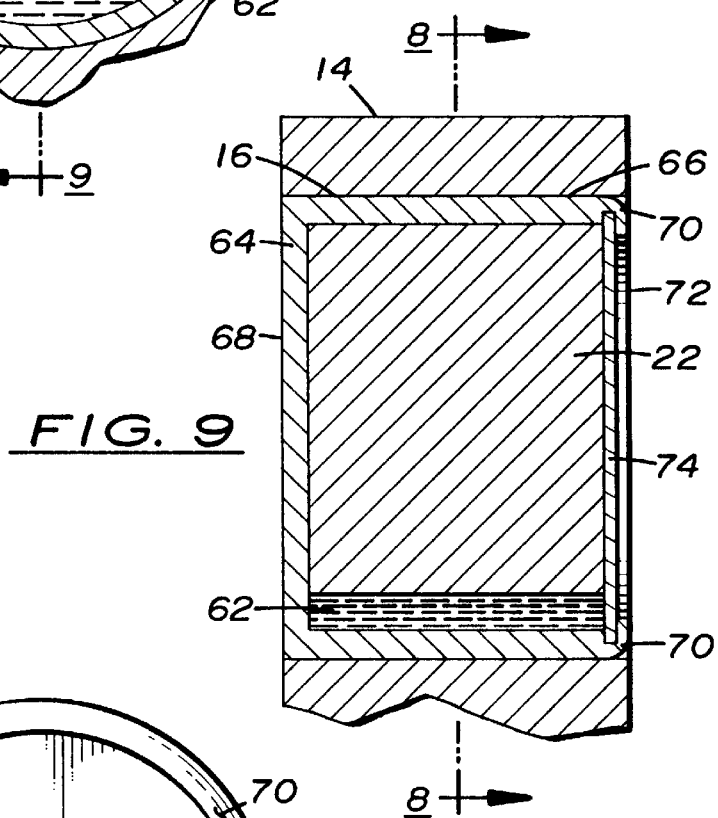
FIG. 9 shows a side section view of the inertial mass, viscous fluid, sleeve, and retaining plate.
Figure 10:
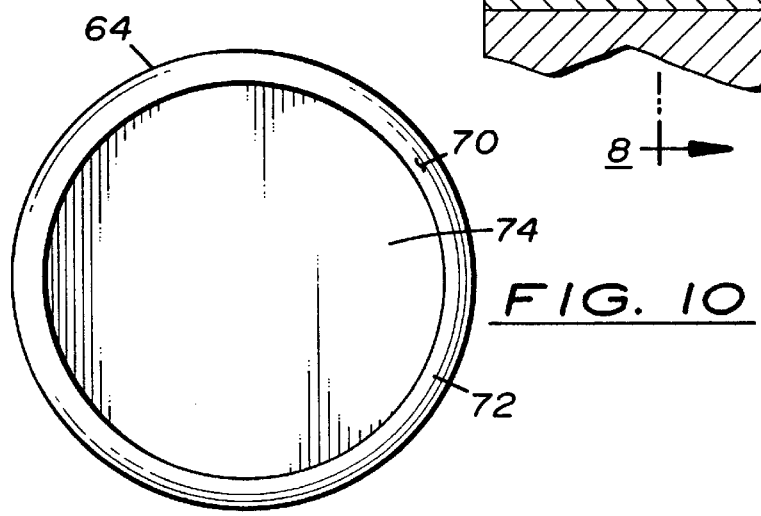
FIG. 10 shows a section view of the sleeve and retaining plate.

As shown in FIG. 9, sleeve 64 is used to contain viscous fluid 62. Like sleeve 54, sleeve 64 has a cylindrical shape and is constructed of steel or other suitable material. The outer diameter 66 of sleeve 64 is of sufficient dimension to require sleeve 64 to be press-fitted into bore 16. Sleeve 64 is closed on one end 68 and incorporates rolled edge 70 at end 72. Inertial mass 22 and viscous fluid 62 are inserted into sleeve 64, and retaining plate 74 is placed across sleeve 64 and fastened by rolled edge 70 to form a leak-proof seal. As shown in FIG. 10, retaining plate 74 completely encloses inertial mass 22 and viscous fluid 62 within sleeve 64.

While an improved method and apparatus for damping impulse and vibration in a crankshaft has been shown and described in detail in this application, it is to be understood that this invention is not to be limited to the exact form disclosed and changes in detail and construction of the various embodiments of the invention may be made without departing from the spirit thereof.

What is claimed is:

1. Apparatus for damping impulse and vibration in a crankshaft having one or more counterweights, said apparatus comprising:
    a) an inertial mass means located in one or more cavities of said counter weights;
    b) an orienting means to keep the inertial means located in a desired location in the cavity;
    c) an energy absorbing means operatively located with the inertial means to dampen vibrations and absorb energy.

2. Apparatus for damping as defined in claim 1, wherein said counterweights have density and said inertial mass means has density, said density equal to or exceeding said density of said counterweights.

3. Apparatus for damping as defined in claim 1, wherein said counterweights contain one or more bores and said apparatus is inserted in said bores.

4. Apparatus for damping as defined in claim 3, further comprising orienting means to position said inertial mass means in an off-center orientation within said bores.

5. Apparatus for damping impulse and vibration in a crankshaft having one or more counterweights comprising:
    a) an inertial means b) inserted in one or more bores in said counterweights, c) an energy absorbing means d) a holding means to hold the energy absorbing means operatively connected to the inertial means.

6. Apparatus for damping as defined in claim 4, wherein said orienting means further comprises means to maintain said inertial mass means in said off-center orientation within said bore during rotation of said crankshaft.

7. Apparatus for damping as defined in claim 4, further comprising retaining means to retain said apparatus in said bore.

8. Apparatus for damping as defined in claim 1, further comprising cylindrical means, said cylindrical means surrounding said inertial mass means and said energy absorbing means.

9. Apparatus for damping vibration and impulse as defined in claim 5, wherein said energy absorbing means comprises elastomeric means.

10. Apparatus for damping vibration and impulse as defined in claim 5, wherein said energy absorbing means comprises viscous means.

11. Apparatus for damping vibration and impulse as defined in claim 5 wherein said energy absorbing means comprises viscoelastic means.

12. Apparatus for damping vibration and impulse in a crankshaft having one or more counterweights containing one or more bores, said apparatus integral to said counterweights, said apparatus comprising:

(a) an inertial mass means;

(b) energy absorbing means, said energy absorbing means surrounding said inertial mass means;

(c) means to orient an inertial mass means in said off-center orientation within said bores;

(d) retaining means for retaining said apparatus in said bores; and (e) cylindrical means, said cylindrical means surrounding said inertial mass means and said energy absorbing means.

13. A method of damping vibration and impulse in a crankshaft having one or more counterweights containing one or more bores, said method comprising the steps of:

(a) placing an inertial mass means within each of said bores;

(b) surrounding said inertial mass means with energy absorbing means; and (c) compressing said energy absorbing means between said inertial mass means and said counterweight in response to said vibration in said crankshaft.

14. A method of damping as described in claim 13, further comprising the step of maintaining an off-center orientation of said inertial mass means with respect to said bore during rotation of said crankshaft.

15. Apparatus for damping as defined in claim 1, wherein said counterweights contain one or more bores and said apparatus is inserted into one or more of said bores.

16. A method for damping vibration and impulse in a crankshaft having one or more counterweights containing one or more bores, said method comprising the steps of:

a) placing an inertial mass means within one or more of said bores;

b) inserting between said inertial mass means and the interior of the bore an energy absorbing means; and c) compressing said energy absorbing means between said inertial mass means and said counterweight in response to said vibration in said crankshaft.

17. Apparatus for damping vibration and impulse in a crankshaft having one or more counterweights containing one or more bores, said apparatus being inserted in one or more of the bores, said apparatus comprising:

a) an inertial mass means;

b) means to orient and restrain said inertial mass means in an off-center orientation within said bores; and c) energy absorbing means, said energy absorber means separating the inertial mass means from the walls of the bore that can be contacted by the restrained inertial mass means.

* * * * *